US008463469B2

(12) United States Patent
Daum et al.

(10) Patent No.: US 8,463,469 B2
(45) Date of Patent: Jun. 11, 2013

(54) DIGITAL RAILROAD SYSTEM (75) Inventors: Wolfgang Daum, Erie, PA (US); Ajith Kuttannair Kumar, Erie, PA (US); Gerald Rose, Erie, PA (US); Glenn Shaffer, Erie, PA (US); Tom Otsubo, Oak Grove, MO (US); Gerald Hess, Jr., Erie, PA (US); John E. Hershey, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 734 days.

(21) Appl. No.: 12/337,090

(22) Filed: Dec. 17, 2008

(65) Prior Publication Data

US 2010/0153419 A1    Jun. 17, 2010

(51) Int. Cl.
*G05D 1/00* (2006.01)

(52) U.S. Cl.
USPC ............... 701/19; 701/20; 701/29.3; 701/117

(58) Field of Classification Search
USPC ...................................... 701/19, 20, 29.3, 117
See application file for complete search history.

(56) References Cited

U.S. PATENT DOCUMENTS

| 5,794,172 | A  | * | 8/1998  | Matheson et al. | 701/117 |
| 6,144,901 | A  | * | 11/2000 | Nickles et al.  | 701/19  |
| 6,339,745 | B1 | * | 1/2002  | Novik           | 701/208 |
| 7,073,753 | B2 | * | 7/2006  | Root et al.     | 246/72  |
| 7,353,181 | B2 | * | 4/2008  | Nel             | 705/7.22 |
| 7,706,938 | B2 | * | 4/2010  | Palladino       | 701/33  |
| 7,783,507 | B2 | * | 8/2010  | Schick et al.   | 705/7.11 |
| 2002/0022984 | A1 | * | 2/2002 | Daniel et al.   | 705/8   |
| 2002/0059075 | A1 | * | 5/2002 | Schick et al.   | 705/1   |
| 2002/0065698 | A1 | * | 5/2002 | Schick et al.   | 705/8   |
| 2003/0055666 | A1 | * | 3/2003 | Roddy et al.    | 705/1   |
| 2004/0133315 | A1 | * | 7/2004 | Kumar et al.    | 700/302 |
| 2005/0205719 | A1 | * | 9/2005 | Hendrickson et al. | 246/122 R |
| 2006/0142913 | A1 | * | 6/2006 | Coffee et al.   | 701/35  |
| 2007/0239292 | A1 | * | 10/2007 | Ehrman et al.  | 700/83  |
| 2008/0177687 | A1 | * | 7/2008 | Friedlander et al. | 706/46 |
| 2008/0269977 | A1 | * | 10/2008 | Palladino     | 701/30  |

FOREIGN PATENT DOCUMENTS

WO    2008005620    1/2008

* cited by examiner

*Primary Examiner* — James Trammell
*Assistant Examiner* — Truc M Do
(74) *Attorney, Agent, or Firm* — Shawn McClintic; Alleman Hall McCoy Russell & Tuttle LLP (57) ABSTRACT Systems are provided for efficiently managing the effects of a change to a transportation system's state. One example system comprises a plurality of distributed data input and data output terminals, the distributed data input terminal configured to automatically generate data related to a first aspect of transportation system operation, at least one of a distributed database and a synchronized database configured to store data, a plurality of distributed computational engines configured to receive data from at least one database, and based on the data received, automatically manage operations of a second, different aspect of the transportation system operations, and a communications network linking the data input terminals, the data output terminals, the databases, and the computational engines, wherein the change to the transportation system's state is initiated by the data generated at the distributed input terminals.

21 Claims, 5 Drawing Sheets

DIGITAL RAILROAD SYSTEM

FIELD

The subject matter disclosed herein relates to methods and systems for facile and flexible reconfiguration of components in a railroad or other transportation system.

BACKGROUND

Railroads provide an infrastructure for handling, transporting, and delivering cargo. Railroad operations involve forming, communicating, and storing a large number of records (e.g., relating to the handling, transportation, and delivery of cargo), while respecting the railroad infrastructure (e.g., rails/routes, wayside equipment, and communication networks), train configuration (e.g., individual locomotives, locomotive consists, rail cars, and cargo), and the like.

Currently, a large portion of railroad system related data is entered manually. Manually entered data requires an inordinate expenditure of labor, incurs significant costs, and is especially prone to error. As the railroad infrastructure and cargo volumes continue to expand, problems associated with manually entered data may become exacerbated. Such errors can translate into significant time and cost losses.

BRIEF DESCRIPTION OF THE INVENTION

Methods and systems are provided for enabling facile reconfiguration of railroad system components in response to a variety of events, changes, and conditions. These may include sudden events and related changes and unexpected operating conditions. In one example, a system for managing effects of a change to a transportation system's state comprises a plurality of distributed data input and data output terminals, the distributed data input terminal configured to automatically generate data related to a first aspect of transportation system operation, at least one of a distributed database and a synchronized database configured to store data, a plurality of distributed computational engines configured to receive data from at least one database, and based on the data received, automatically manage operations of a second, different aspect of the transportation system operations, and a communications network linking the data input terminals, the data output terminals, the databases, and the computational engines, wherein the change to the transportation system's state is initiated by the data generated at the distributed input terminals.

As one example, the railroad system may be reconfigured in response to data input regarding track maintenance. Based on the maintenance schedule, affected locomotives may be rerouted or rescheduled. Since the rerouting of the locomotive may also affect other system elements, such as the cargo being transported by a goods locomotive, or the passengers being transported by a passenger locomotive, the system may be reconfigured while taking into consideration system elements affected by the track maintenance schedule. Thus in one example, if the cargo is not time-sensitive, the affected goods locomotive may be rescheduled to run on the affected track at a later time (following maintenance work) while the affected passenger locomotive may be rerouted to allow the passengers to reach their final destination with minimum delay.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
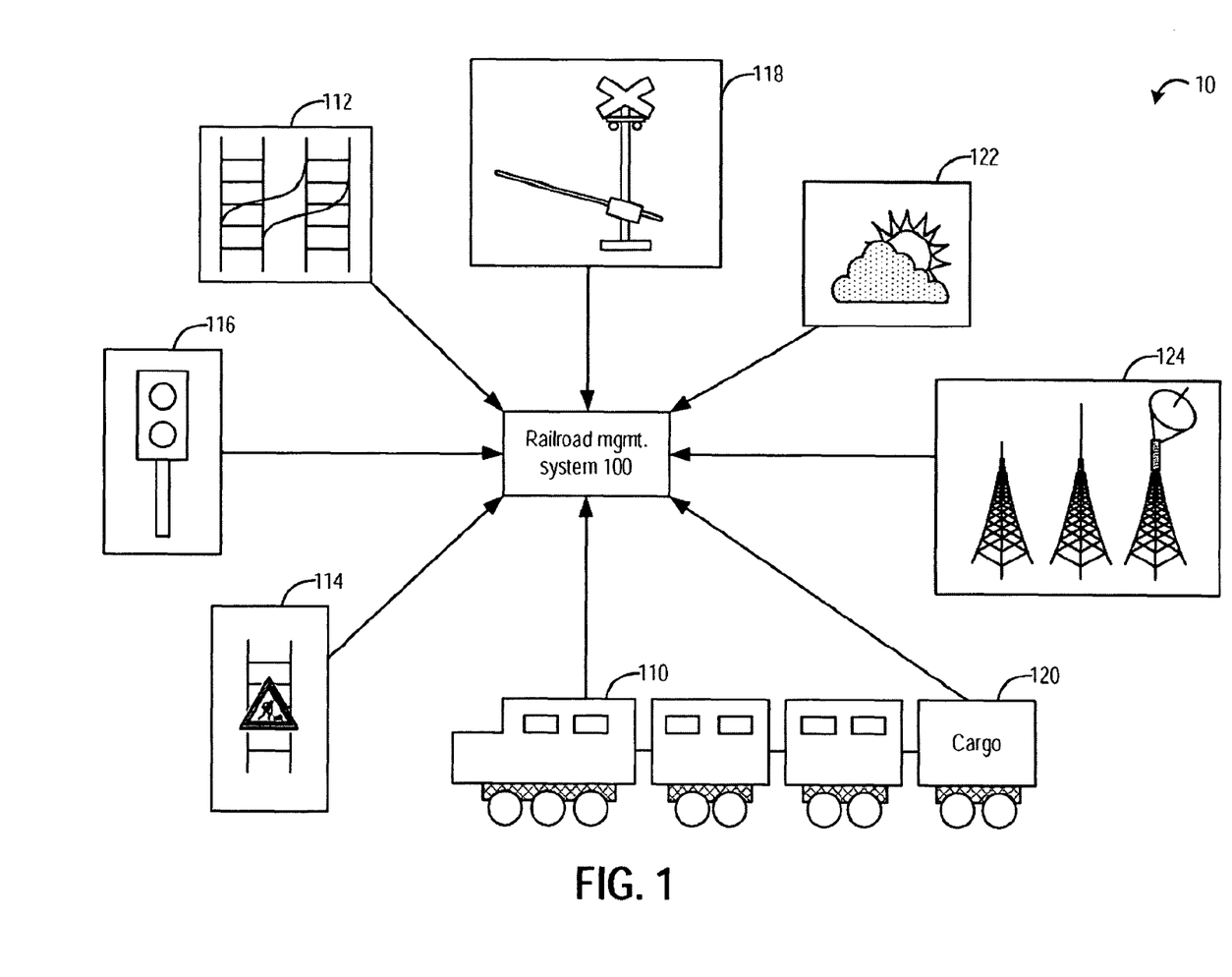
FIG. 1 shows an example embodiment of a railroad system configured to receive a variety of inputs.
Figure 2:
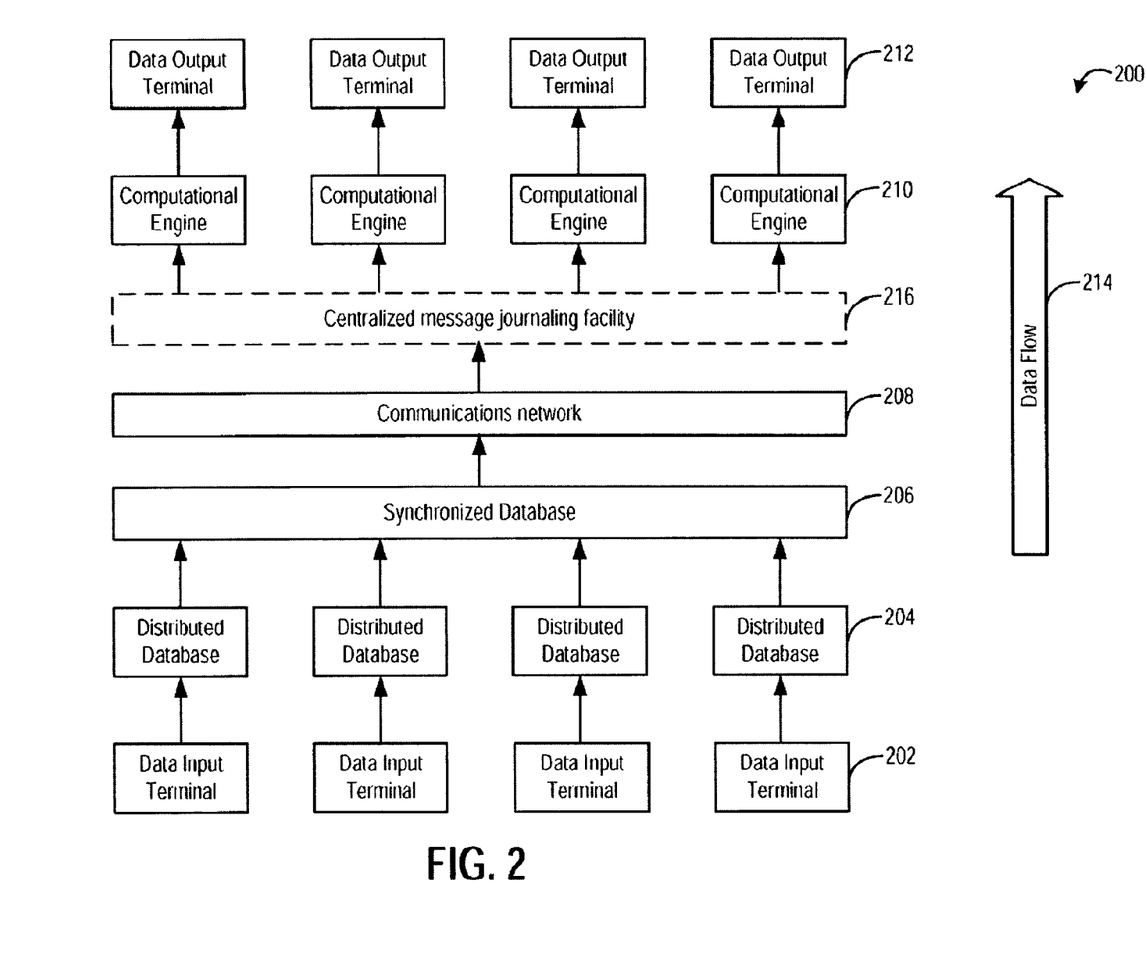
FIG. 2 shows the system and elements of the railroad system of FIG. 1 arranged in an alternate configuration as a multi-dimensional system state vector.
Figure 3:
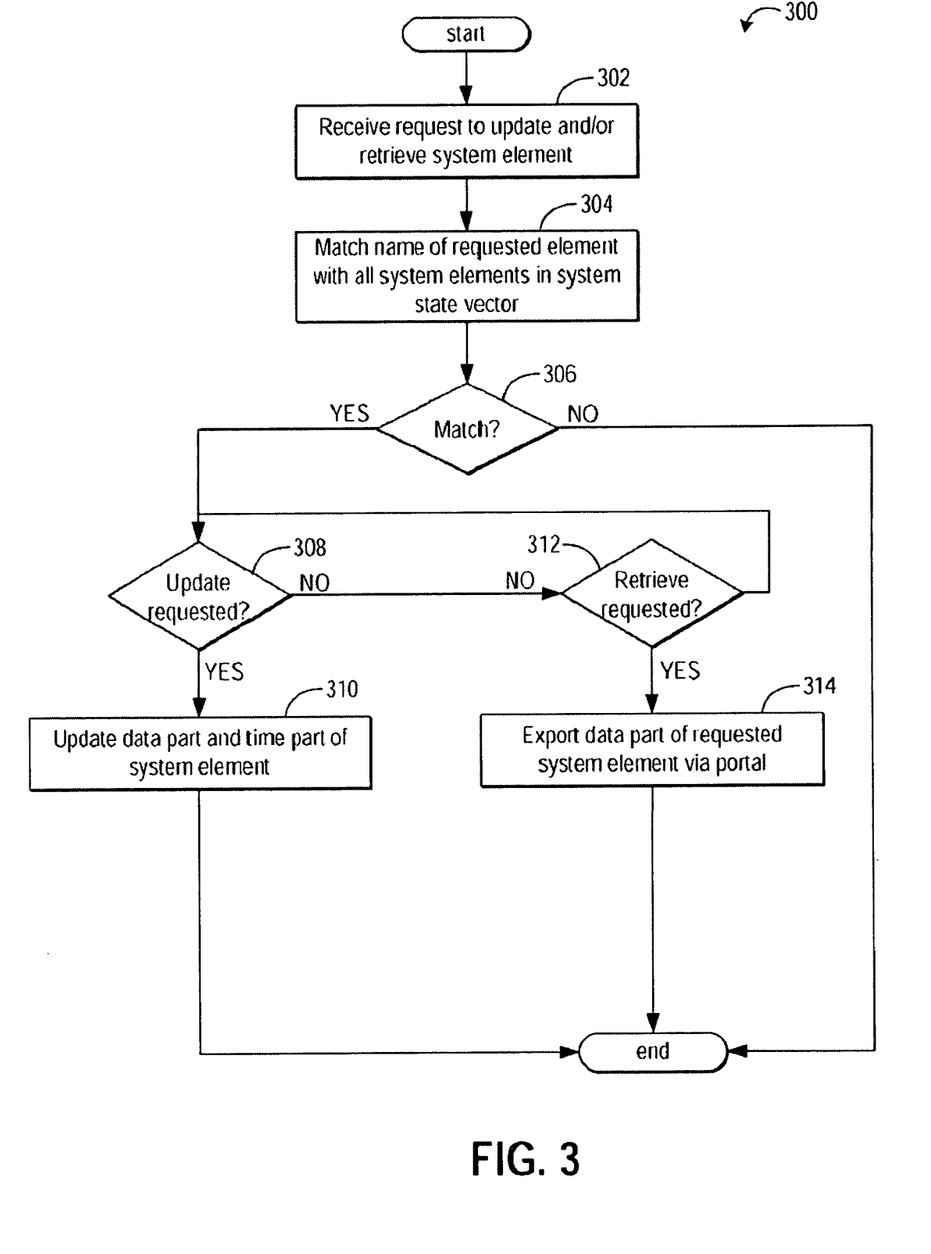
FIG. 3 shows a high level flow chart for updating and/or retrieving data from the railroad system of FIG. 2.

Railroad systems, such as the one depicted in FIG. 1, may be large and highly integrated systems. As the number of railroad system components increases, such as when railroad infrastructure and cargo volumes expand, the railroad systems acquire greater levels of complexity. Moreover, the railroad systems are dynamic systems with frequent changes in missions, consists, and destinations, as non-limiting examples. Changes may occur separately or simultaneously at different levels of the railroad system. In one example, the plurality of states of the railroad system may be represented by a multidimensional system state vector, as depicted in FIG. 2, to facilitate the variety of updates and reconfigurations required in the otherwise complex system. A railroad management system may be configured to update the railroad system by performing an update routine, such as depicted in FIG. 3. The railroad system may also be reconfigured by the railroad management system, without a substantial need for manual input, by performing reconfiguration routines, such as those depicted in FIGS. 4-5. In this way, the technical effect is that the railroad system may be optimized responsive to the changes incurred with fewer errors, at reduced costs, and with minimum time loss. And, by digitizing a railroad system, the system may be rapidly and reliably updated, reconfigured, and optimized, yielding improved efficiency.

FIG. 1 shows an example embodiment of a railroad system 10 that comprises a distributed railroad data management and control system 100 (hereinafter "railroad management system") interconnecting and/or managing the various other components of the railroad system 10. As such, the railroad management system 100 may be a large and integrated system configured to receive multiple inputs from a plurality of railroad system components (herein also referred to as system elements), such as those illustrated at 110 through 124. In one example, the plurality of states of railroad system 10 may be defined as embodying and/or using a multi-dimensional system state vector and the plurality of system components 110 through 124 may be defined as inputs to the multi-dimensional system state vector. As such, the data pertaining to the plurality of states of railroad system 10, that is the representative multi-dimensional state vector, may be included in railroad management system 100. Thus, in one example, the state of a system element, such as the state of a switching gear, may be defined as an input to the multi-dimensional state vector and consequently a change in the state of the switching gear may be received by railroad management system 100 and may be represented by a change in a value of the multi-dimensional state vector, the change in the multi-dimensional state vector representing the change in the state (or states) of railroad system 10.

The components of the railroad management system 100 (for example, those shown in the embodiment in FIG. 2) may be housed in a number of distinct locations, such as within an independent railroad system housing (not shown). Alternatively, the system 100 may be maintained partially on a moving platform, such as on a locomotive 110 of the railroad system 10. The railroad management system 100 may receive inputs from the plurality of system components and accordingly perform regular update routines. If the received input requires subsequent adjustments to one or more system elements, the system 100 may accordingly perform a reconfiguration and/or optimization routine.

As a first example, the railroad management system 100 may receive an input regarding the state of wayside equipment 112. Wayside equipment 112 may include, but not be limited to, the railroad track switching gear, hump yard retarders, hot box detectors, and axel counters. In one example, the input provided from wayside equipment 112 may include information regarding the state of the switching gear. As another example, the system may receive input regarding the state of the track 114, including information regarding repair or maintenance work that may be required and/or scheduled, or work that is under way. In one example, when it is determined that further maintenance work on the railroad track (or a segment thereof) is required, the railroad management system 100 may be configured to reroute locomotives to avoid that track. In another example, when it is determined that the track has been repaired, the railroad management system 100 may be configured to re-enable locomotives to be routed along that track.

Railroad management system 100 may also receive input from track signal 116. In one example, the system may be informed whether a locomotive/train is allowed to pass a certain segment of track or whether the locomotive will have to stall there, depending upon the signal. Accordingly, further information may be provided regarding an estimated duration of stalling, signal timing, etc. As one example, based on the signal and related details, and further based on the urgency of the locomotive mission, the railroad management system 100 may reconfigure the mission route of the affected locomotive to avoid the signal. Alternatively, the system may adjust the speed (for example, transiently increase the speed) of the locomotive when traversing that section, to thereby avoid the signal. Railroad management system 100 may also receive input from railroad safety devices such as regarding the state of crossing gear 118. As one example, a crossing gear malfunction may result in a slow or reduced speed order. This may be updated into the railroad management system 100 for appropriate rerouting of locomotives, for example of locomotives transporting time sensitive cargo.

Railroad management system 100 may further receive input regarding the make-up of a train 110. This may include information regarding the number and type of locomotives in the train, the number and type of locomotives in a locomotive consist in the train (a "consist" being a group of locomotives controlled together), the number of electronic and mechanical modules present in each locomotive, their series, their order, the options available on each one of them, their limitations, etc. In one example, it may be determined that one or more of the electronic modules require an upgrade and the mission may be delayed until the appropriate upgrade has occurred. In another example, it may be determined that a locomotive consist has a sub-threshold number of cars and consequently may be able to pick up more cars along the route. Details regarding the options available on the locomotive may also be included. The locomotive may further comprise a control system having computer readable storage medium with code therein. The code may be reconfigurable responsive to information received by the control system from sources external to the locomotive. These external sources may include the various inputs (destination details, track conditions, etc.) described herein for the railroad management system 100. Upon receiving information from the external sources, the locomotive control system may reconfigure the code such that the reconfigured code in turn changes a mode of operation of the locomotive. In one example, a locomotive may be configured with a schedule optimizing routine, such as "trip optimizer" software. In other words, the control system of the locomotive may include schedule optimizing code. Upon receiving information from external sources, the control system may generate reconfigured code which in turn may change data inputs to the schedule optimizing code. As such, the schedule optimizing code may be configured to recalculate a locomotive schedule responsive to any changes in the mode of operation of the locomotive. Herein, the code reconfigured by the locomotive control system may have cascading effects on other codes of the system.

Further, the "trip optimizer" software may itself be configured with multiple options. For example, the software may include a "trip optimizer" maximum speed limit, indicative of a maximum speed limit allowable in the region the locomotive is passing through. The software may be configured to include an alternate maximum speed limit, for example defined not by external speed limits, but by a maximum attainable cab (locomotive) speed. Reconfigured code received from the railroad control system may change the maximum allowed speed of the locomotive. As such, this alternate speed limit may not be enforced under normal railroad operating conditions. However, under conditions of urgency, for example when transporting time-sensitive cargo and/or when there have been unexpected delays, the locomotive may be configured to operate the "trip optimizer" software with the maximum cab speed limit, to thereby allow a timely arrival of cargo at the desired destination. Further, the "trip optimizer" software may recalculate the optimum route responsive to the maximum speed limit.

The system 100 may further receive information regarding the state of the rolling stock. This may include information pertaining to all the locomotives or other rail cars operating and moving on the railroad system 10. As one example, the system 100 may be updated regarding the reduced viability of a car of the rolling stock following an inspection in a classification yard. Consequently, the order of cars in a train may be adversely affected and the railroad management system may be required to initiate reconfiguration of the order of cars in the train, and/or initiate replacement of the car.

In the same way, the railroad management system 100 may receive input regarding the state of the cargo 120 being transported by train 110. This may include information about the cargo contents, such as their weight, their nature, their shelf-life, their transportation conditions, etc. In one example, if the cargo is heat sensitive, the railroad management system may be configured to adjust the locomotive route to avoid regions with high ambient temperatures. In another example, if the cargo is time-sensitive, the railroad system may select a route with a reduced number of scheduled stops.

The railroad management system 100 may also receive information regarding the destination 122 of a train 110. This may include its geographical location, time zone, optional and preferred routes of access, weather conditions, terrain conditions, temperature and humidity conditions, etc. In one example, when the terrain at the location is determined to be uneven and may possibly lead to vibration of cargo contents, and further when it is known that the cargo is vibration-sensitive, the speed of the locomotive may be significantly reduced as the destination is approached to avoid damage to cargo contents.

The railroad management system 100 may further receive information regarding the communications network 124 of the railroad system 10. This may include an update regarding the status of satellite signals, cellular phone signals and other radio/wireless signals, WI-FI signals, Bluetooth® and other local area signals, and the like. Herein, the locomotive control system may provide reconfigured code to change a communication mode of the locomotive when communicating with a remote device. As one example, each locomotive may be in communication with a central railroad system communications network via cellular phone signals. If the locomotive passes through a region where no cellular signal may be received, and consequently communication may be lost, the system may be updated and the locomotive may be appropriately configured to shift to a radio-signal mode of communication at least when passing through that region. In another example, the communication mode may be changed from rail signaling to cellular signaling. In this way, a constant communication link may be maintained.

It will be appreciated that updates and changes in some components of the railroad system 10 may ripple through the entire railroad system as other components of the multi-dimensional railroad system are in turn affected. Thus, for example, when rerouting as a result of a switching gear malfunction related delay, the selection of the new route may have to factor in the sensitivities and limitations of the cargo being transported.

By performing regular updates on numerous components of a railroad system, the need for manual entry of data, which is inherently error-prone, may be substantially eliminated or reduced. By digitizing inputs, substantial improvements may be made in data entry, data transportation, data integrity, and data storage. Further, by digitally integrating numerous components of the railroad system, inputs can be rapidly and reliably updated and the speed and accuracy with which the highly complex railroad system may respond to the myriad of possible changes may be significantly increased. Thus, in one embodiment, the various components 100-124 of the railroad system 10 automatically generate data relating to operations and operational conditions in the railroad system 10, which is then transmitted to the railroad management system 100 for automatic processing and use in managing the railroad system, including possible control and/or re-transmission to other elements in the railroad system 10.

FIG. 2 depicts an alternate configuration 200 of the railroad management system wherein the railroad system and the system components are represented as a multi-dimensional state vector receiving inputs from input terminals and delivering outputs to output terminals. By using such a configuration, management of the vast array of data pertaining to the railroad system, and further management of frequent updates and changes, may be performed with greater precision. As such, in the depicted multi-dimensional state vector, data may flow in a single direction, from data input to data output, as shown.

First, data regarding the railroad system's state may be entered into the multidimensional state vector by distributed data input terminals 202. These may include a manual data entry station, an electronic data entry station, a sensor, and/or a data interface to another data communications network. As such, each data input may be reflective of information pertaining to a system element and may be related to a first aspect of the railroad system's operations. The data input terminal may be configured to automatically generate data, for example, after predefined time intervals. The data may then be directed to and stored in one of a plurality of distributed databases 204, each distributed database 204 connected to at least one distributed data input terminal 202. The data received from all the distributed databases may then be compiled and stored in a centrally located synchronized database 206. From here, the data may be configured to pass through a communications network 208 that links the data input terminals 202 to data output terminals 212, via intermediary databases 204 and 206, and computational engines 210. As such, communications network 208 may be configured to provide message encryption and/or message authentication. Distributed computational engines 210 may be configured to perform appropriate computations to the input data and provide the results through the data output terminals. Based on the data received, the distributed computational engine automatically manages operations of a second, different aspect of the railroad system's operations, by either performing a direct control of the railroad system elements or by transmitting the data to one or more of the data output terminals relevant to the second aspect of the railroad system's operations. As such, data output terminals 212 may include a visual data display, an acoustic output device, an electronic data output portal, and/or a data interface to another data communications network. A centralized message journaling facility 216 may optionally be included for logging the messages. As indicated by data flow arrow 214, data may be configured to flow in a single direction, specifically from data input to data output. In one example, the railroad system may be operating on a current database wherein the contents of the database are designated as being valid until deleted (or otherwise denoted as not being valid). However, following a synchronization event, the system may be configured to operate on a predicted database wherein the contents of the database are not currently valid but are instead forecast as being valid in the future. As such, the synchronization event may be defined as an event that defines a timing at which the future database becomes valid to match a future timing at which the transportation (herein railroad) system's state will change.

Figure 4:
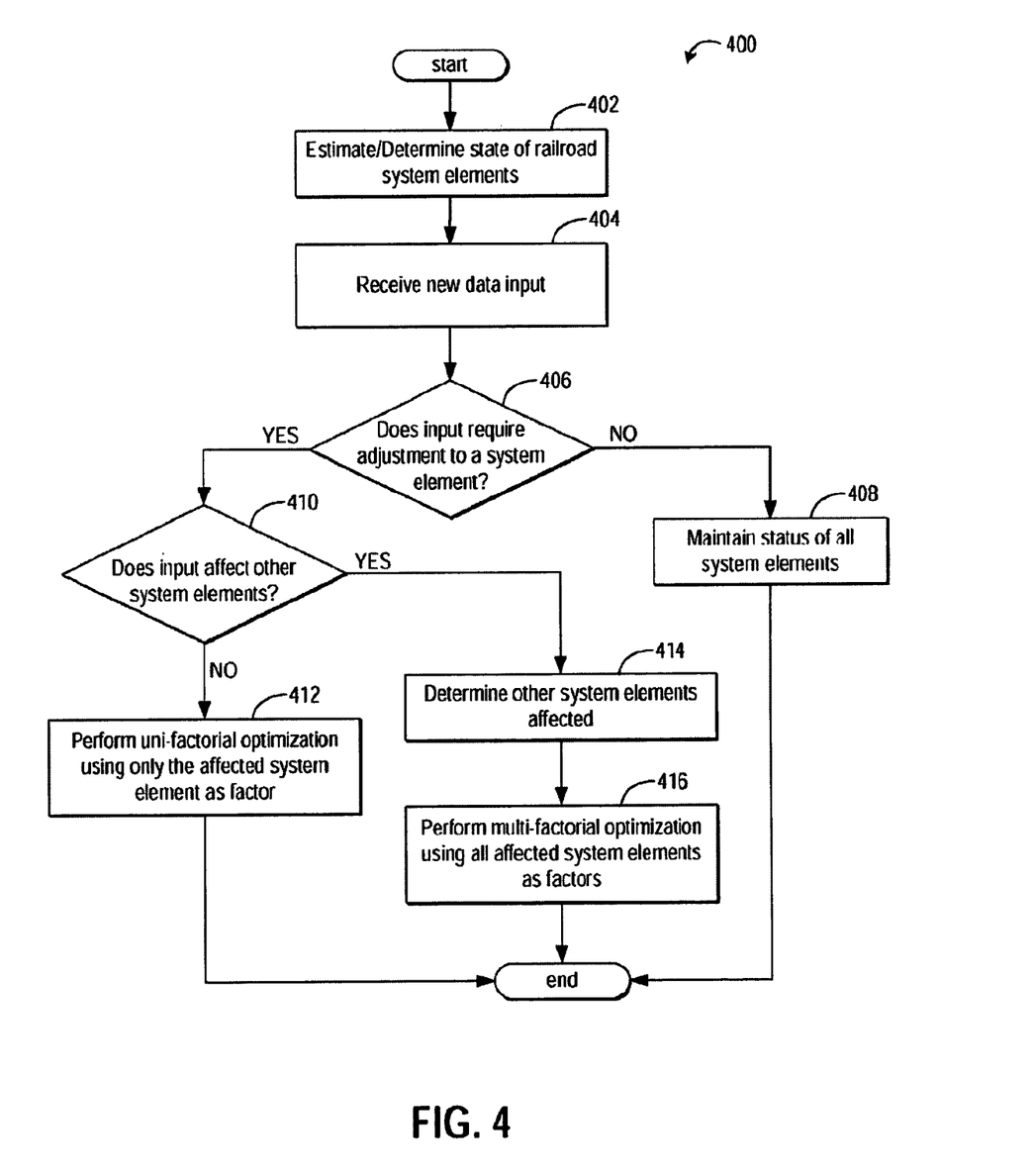
FIG. 4 shows a high level flow chart for reconfiguring the railroad system according to the present disclosure.
Figure 5:
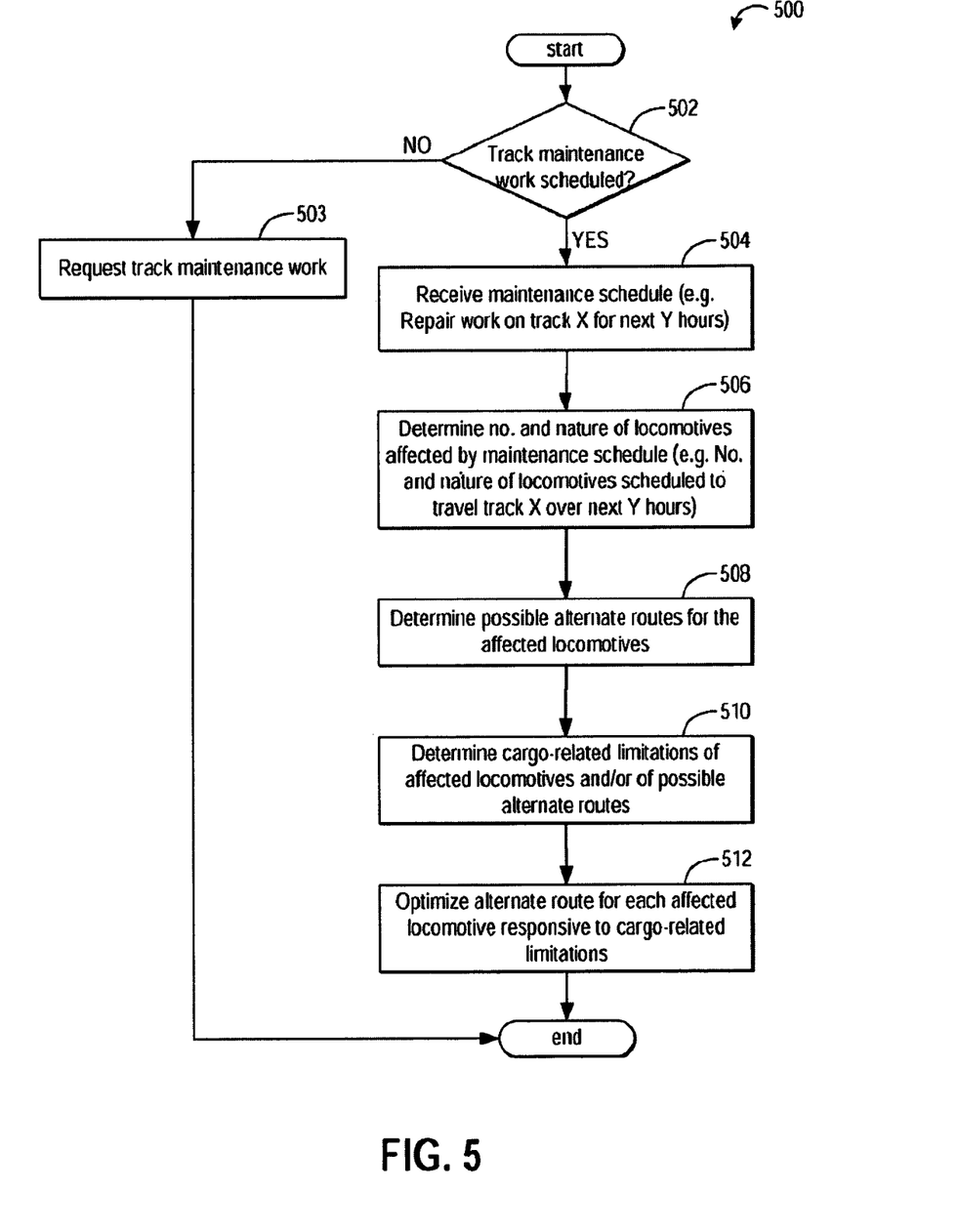
FIG. 5 shows an example case scenario for reconfiguring the railroad system according to the present disclosure in response to scheduled track maintenance and/or repair work.

Based on the nature of the data input at the data input terminal 202, the railroad management system 200 (including the multi-dimensional state vector representative of the state of the railroad system) may be configured to perform an update and/or retrieve routine, such as depicted herein with reference to FIG. 3, or to perform an optimization and/or reconfiguration routine, such as depicted herein with reference to FIGS. 4-5.

Now turning to FIG. 3, an update and/or retrieval routine 300 is described. At 302, the management system 100, 200 may receive a request to update and/or retrieve data pertaining to a railroad system element. In one example, the system may be configured to perform regular updates at regular time intervals. As one example, the state of each system element of the railroad system may be updated every 5 seconds, to thereby regularly update the overall state of the railroad system. In another example, the updates may be performed in an event-based manner. As one example, the updates may be performed once every preselected time period (e.g., once per hour, or the like), or the update may be performed in response to certain events, such as receiving an update command. Accordingly, at 304, the name of the requested element may be matched with all the system elements present in the system state vector. It will be appreciated that, as such, the system state vector may be represented by a linear concatenation of system elements. Further, each system element may include a data part and a time part. The time part of the system element may indicate the time that the data part of the system element was last updated.

At 306, it is determined whether a match has been found or not. If no match is found, then the routine may end. If a match is found, then at 308 it is determined whether the initial request was for an update. If so, then at 310, the data part of the system element may be updated and the time part of the system element may also be appropriately updated. If at 308, it is determined that the initial request was not for an update, then at 312, it is determined whether the initial request was for a retrieval. Accordingly, at 314, the data part of the requested system element may be exported via a portal.

Now turning to FIG. 4, an optimization routine 400 is described wherein the management system 100, 200 is configured to adjust the state of the railroad system multi-dimensional state vector in response to updates received regarding one or more system elements. In one example, such an optimization routine may be performed on a regular basis immediately following the update routine of FIG. 3. Alternatively, the optimization routine may be event-driven.

At 402, the updated details of the railroad system elements may be received, for example, from the output of update routine 300. At 404, a new data input may be received. Accordingly, at 406, it may be determined whether the nature of the input entails adjustments to a system element. If no adjustment is required, then at 408, the status of all the system elements may be maintained. If an adjustment is required, then at 410 it is determined whether the input affects system elements other than the one it is directly associated with. If no other system elements are affected, then at 412, the system may perform a uni-factorial optimization using only the directly associated system element as a factor. If at 410 it is determined that the input affects other system elements, then at 414, the other affected system elements may be determined. Following this, at 416, the system may perform a multi-factorial optimization using all the affected system elements as factors.

To further illustrate the concepts introduced in FIGS. 3-4, an example scenario and a related optimization routine 500 is described herein with respect to FIG. 5. In one example, prior to performing routine 500, an update routine 300 may be performed to update the railroad system multi-dimensional state vector (stored and calculated in the railroad management system 100, 200) of the state of all the elements in the system. Based on the updates received, it may be determined that a certain segment of track may require repair and/or maintenance work. Based on this prior information, at 502, it may be determined whether track maintenance and/or repair work has been scheduled or not. If no maintenance and/or repair work has been scheduled, then at 503, a request for maintenance and/or repair work may be sent. If maintenance/repair work has been requested, then at 504, the maintenance and/or repair schedule may be received. In one example, a certain segment of track X ("X" being a track segment identifier) may be configured to receive repair work for the following Y hours ("Y" being a real number). As such, the segment of track X that is to be repaired may be defined by geographical markers such as geographical co-ordinates, or distances from closest train stops. Other markers may also be used to identify the segment of track undergoing work. At 506, the system may determine the number of locomotives affected by the maintenance schedule. This may include determining the number of locomotives configured to travel along track X over the next Y hours. Further, the nature of the locomotives affected by the schedule may also be noted. As one example, this may include determining whether the locomotive is a passenger train or a goods/freight train. If the locomotive is a goods train, the nature of the cargo being transported may also be noted.

At 508, a list of possible alternate routes for each of the affected locomotives may be compiled. Following this, at 510, based on the nature of the locomotive, alternate limitations of the affected locomotives may be determined. As one example, the cargo limitations of the affected locomotives may be determined. In one example, if the cargo is heat sensitive, the locomotive may not be rerouted though areas with high ambient temperatures. In another example, if the cargo is vibration-sensitive, the locomotive may not be rerouted through areas with significantly uneven terrains. Based on the limitations identified at 510, at 512, the alternate route along which the affected locomotive is to be rerouted may be optimized.

It will be appreciated that while a railroad system is used herein as an example embodiment, similar routines and methods for system management may be applied for marine propulsion systems, off-highway vehicle (OHV) systems, and other transportation systems generally.

In this way, a locomotive may be configured with a control system having computer readable storage medium with code therein, the code being reconfigurable responsive to information generated automatically and transmitted through the railroad system. As such, the information, related to a first aspect of the locomotive's operations, may be received by the control system from sources external to the locomotive. The technical effect of the reconfiguration of the code may include an automatic change in a second aspect of the locomotive's operation through the multi-dimensional state vector in the control system, the multi-dimensional state vector including a plurality of states of the railroad system.

In this way, a railroad system may be managed using a digitized railroad system format. By addressing the railroad system as a multi-dimensional system state vector and the variety of system elements as data inputs, the data may be efficiently processed through a series of databases, computational engines, and data communications networks. In doing so, the speed and precision with which railroad system may be updated, retrieved, and/or reconfigured may be significantly enhanced. By rapidly and reliably processing the copious volumes of railroad system data, the railroad system may be managed in an efficient manner.

Note that the example control and estimation routines included herein can be used with various engine, ship, and/or locomotive system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for managing a railroad system having a plurality of components, the system comprising:
   a plurality of distributed data input terminals, each data input terminal corresponding to a component of the railroad system and configured to automatically generate input data related to a first aspect of the railroad system;
   at least one of a distributed database and a synchronized database coupled to each of the input terminals and configured to store the input data;
   a plurality of distributed computational engines configured to receive the input data, and based on the input data received, provide computations and output data; and
   automatically manage operations of a second, different aspect of the railroad system;
   a plurality of data output terminals coupled to the computational engines for receiving the output data therefrom; and wherein
   the system is configured to perform an optimization routine in response to input data including determining whether the input data requires adjustment to a first system element that is associated with the input data and performing a uni-factorial optimization in response thereto; and determining whether the input data requires adjustment to a system element other than the first system element that it is associated with and performing a multi-factorial optimization using all affected system elements as factors in response thereto.

2. The system of claim 1, wherein the railroad system is represented as a multi-dimensional state vector, wherein the input data related to the first aspect of the railroad system changes the multi-dimensional state vector, and wherein the output data is based on the changed multi-dimensional state vector.

3. The system of claim 2, wherein the input data includes a change in infrastructure and a change in cargo.

4. The system of claim 2 wherein at least one of the data input terminals comprises at least one of a manual data entry station, an electronic data entry station, a sensor, and a data interface to another data communications network.

5. The system of claim 2 wherein at least one of the data output terminals comprises at least one of a visual data display, an acoustic output device, an electronic data output portal, and a data interface to another data communications network.

6. The system of claim 2, further comprising a communications network linking the data input terminals, the data output terminals, the databases, and the computational engines, wherein the communications network provides for at least one of message encryption and message authentication.

7. The system of claim 6, further comprising a centralized message journaling facility configured to log encrypted and/or authenticated messages communicated through the communications network.

8. The system of claim 2, comprising a distributed database and a synchronized database.

9. The system of claim 2, wherein the at least one of a distributed database and the synchronized database includes a current database, and wherein the plurality of distributed computational engines are configured to receive input data from the current database before a synchronization event.

10. The system of claim 9, wherein the plurality of distributed computational engines are configured to receive input data from a predicted database following the synchronization event.

11. The system of claim 1, wherein the railroad system includes a locomotive.

12. The system of claim 1, wherein the plurality of distributed computational engines automatically manage operations of the second aspect of the railroad system by at least one of directly controlling railroad system components or transmitting output data to one or more data output terminals relevant to the second aspect of the railroad system.

13. A locomotive, comprising:
   a control system having computer readable storage medium with code therein, the code being reconfigurable responsive to information generated automatically and transmitted through a railroad system, the information received by the control system from sources external to the locomotive, the information related to a first aspect of the locomotive, wherein the reconfigured code automatically changes a second aspect of the locomotive through a multi-dimensional state vector in the control system, the multi-dimensional state vector including a plurality of states of the railroad system; the code configured to perform an optimization routine in response to the information including performing a uni-factorial optimization if the information requires adjustment to one component of the railroad system and performing a multi-factorial optimization if the information affects multiple components of the railroad system.

14. The locomotive of claim 13 wherein the reconfigured code changes a maximum allowed speed of the locomotive.

15. The locomotive of claim 13 wherein the reconfigured code changes a communication mode of the locomotive when communicating with a remote device.

16. The locomotive of claim 15 wherein the communication mode is changed from rail signaling to cellular signaling.

17. The locomotive of claim 13 wherein the control system further includes a schedule optimizing code, and wherein the reconfigured code changes data inputs to the schedule optimizing code, the schedule optimizing code being configured to recalculate a schedule responsive to a change in mode of operation of the locomotive.

18. The locomotive of claim 13 wherein the control system operates on a current database.

19. The locomotive of claim 18 wherein, following a synchronization event, the control system shifts operation to a predicted database.

20. A method for managing a railroad system having a plurality of components, the railroad system represented as a multi-dimensional state vector, the method comprising:
   automatically generating input data related to a first aspect of the railroad system in at least one of a plurality of distributed data input terminals, wherein the automatically generated input data related to the first aspect of the railroad system changes the multi-dimensional state vector;
   storing the input data generated in the distributed data input terminal in at least one of a distributed database and a synchronized database;
   receiving the input data and providing computations and output data in at least one of a plurality of distributed computational engines;
   determining whether the input data requires adjustment to a system element associated with the input data and if so, determining whether the input data requires adjustment to system elements other than the one it is directly associated with;

performing an optimization routine in response to the input data including performing a uni-factorial optimization if the input requires adjustment to the system element associated with the input data and performing a multi-factorial optimization if the input affects system elements other than the one it is directly associated with;

adjusting operation of a second aspect of the railroad system based on the input data received, said second aspect being different from said first aspect; and communicating the adjusted operation to at least one of a plurality of data output terminals to thereby enable a change in the railroad system.

21. The method of claim 20, further comprising logging encrypted and/or authenticated messages communicated between the distributed input terminals and output terminals at a centralized message journaling facility of the railroad system.

* * * * *